Dec. 6, 1960  E. D. NUTTALL  2,963,644
METHODS OF AND APPARATUS FOR DETERMINING THE WALL
THICKNESS OF METALLIC ELEMENTS
Filed Sept. 19, 1956  4 Sheets-Sheet 1
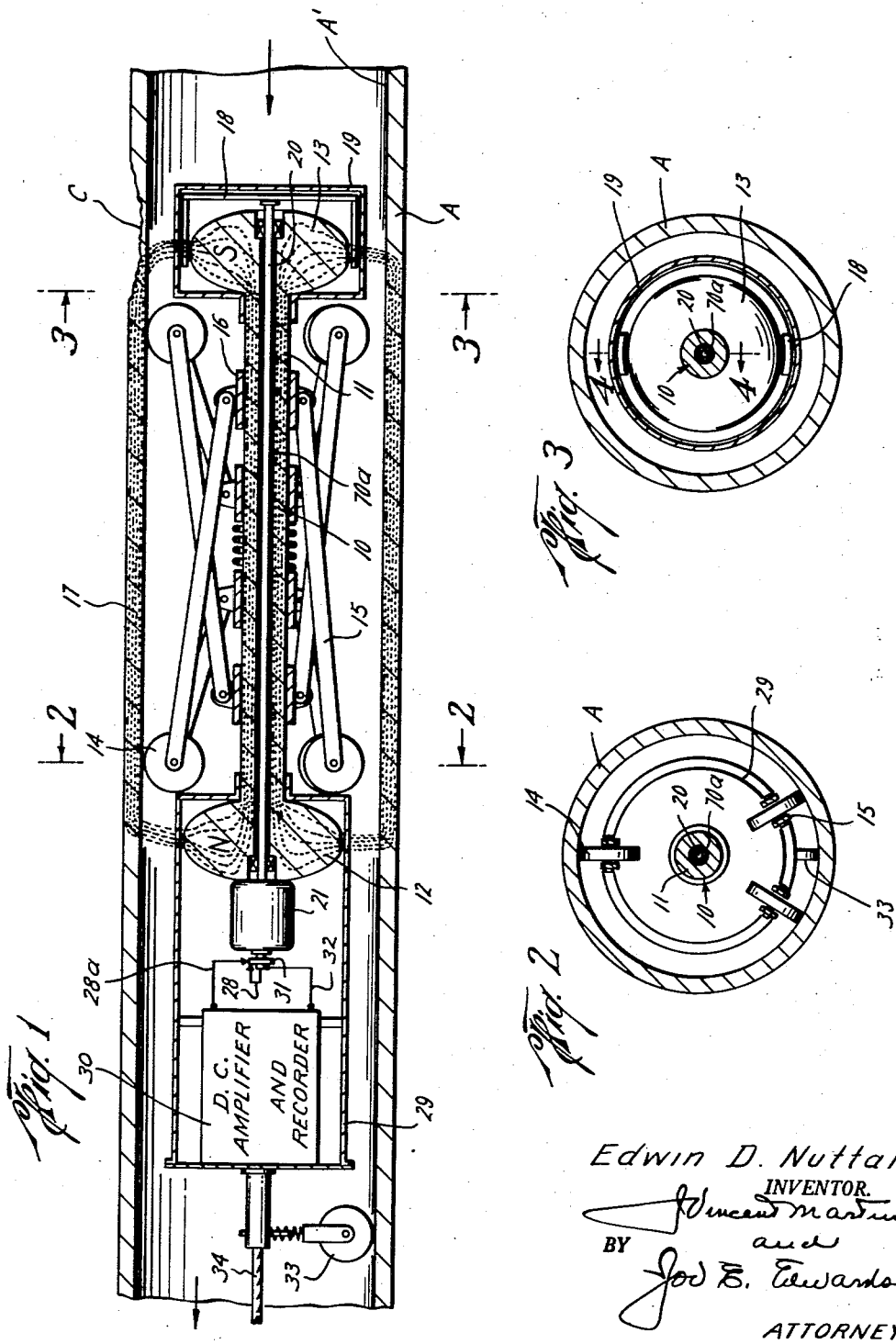
Edwin D. Nuttall
INVENTOR.
BY
ATTORNEYS Dec. 6, 1960 E. D. NUTTALL 2,963,644
METHODS OF AND APPARATUS FOR DETERMINING THE WALL
THICKNESS OF METALLIC ELEMENTS
Filed Sept. 19, 1956 4 Sheets-Sheet 2
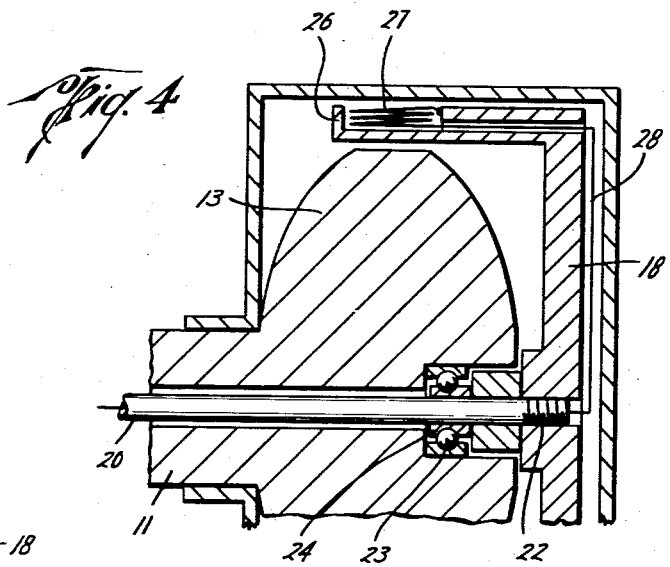
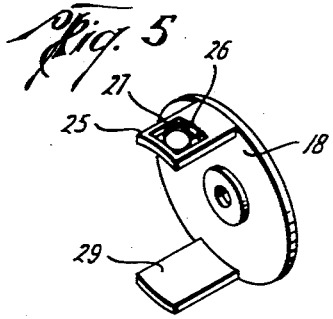
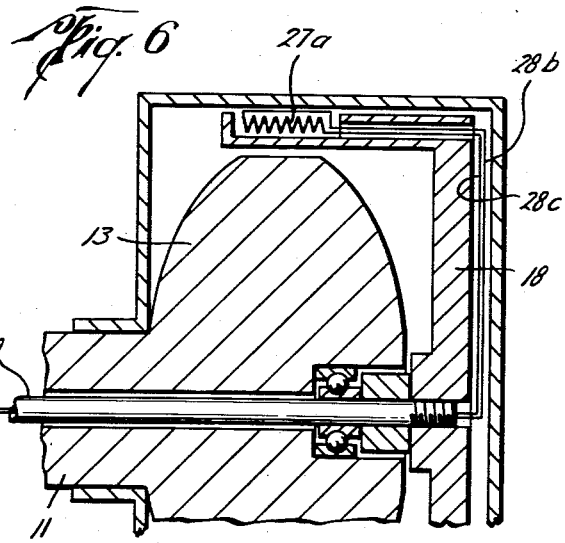
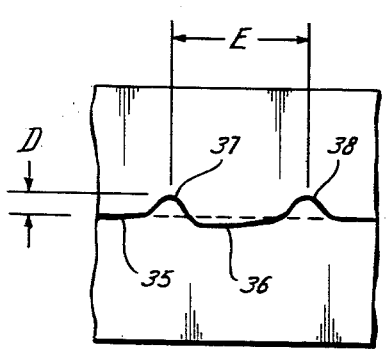
Edwin D. Nuttall
INVENTOR.
BY Vincent Martin
and
Joe E. Edwards
ATTORNEYS Dec. 6, 1960 E. D. NUTTALL 2,963,644
METHODS OF AND APPARATUS FOR DETERMINING THE WALL
THICKNESS OF METALLIC ELEMENTS
Filed Sept. 19, 1956 4 Sheets-Sheet 3
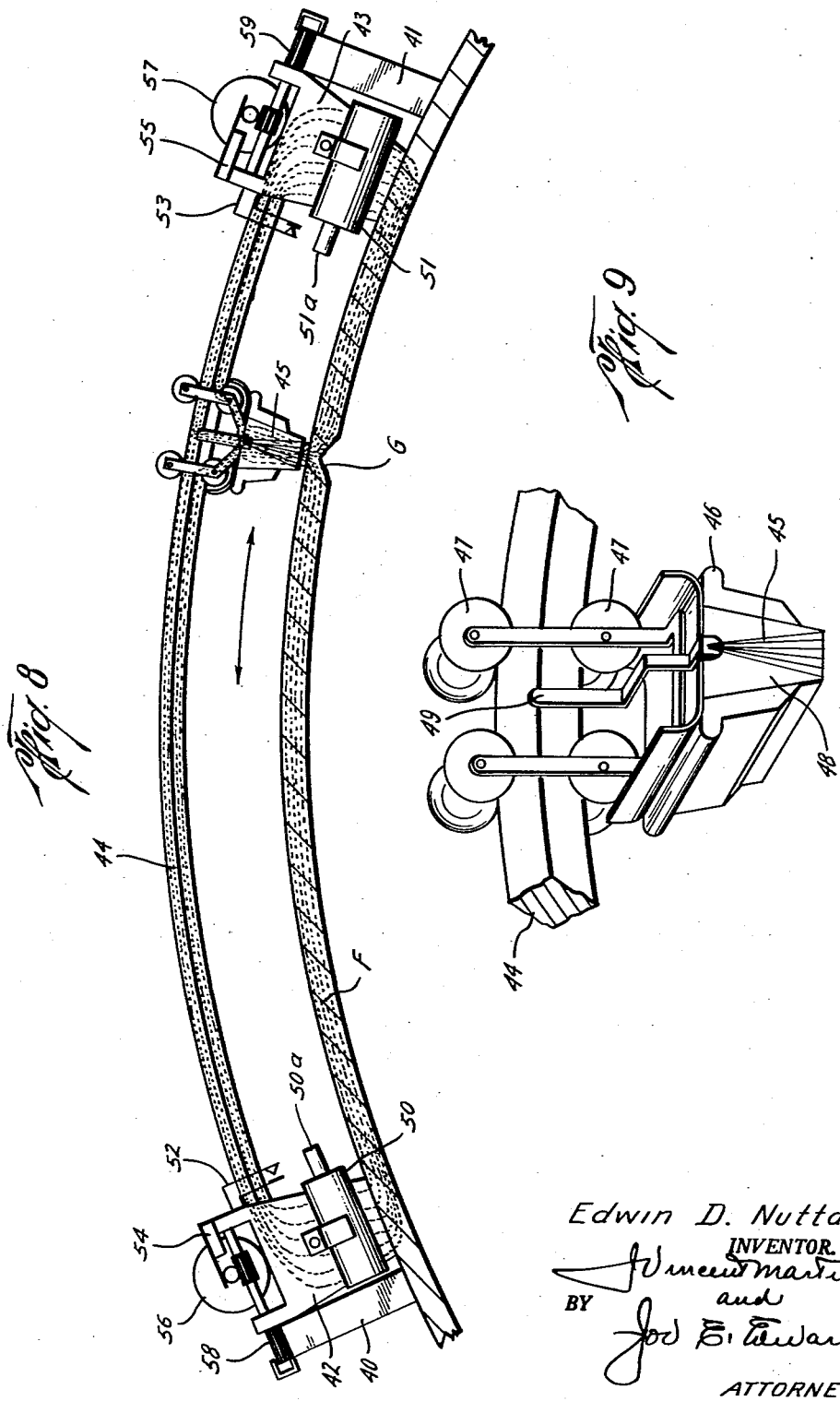
Edwin D. Nuttall
INVENTOR.
BY
ATTORNEYS Dec. 6, 1960 E. D. NUTTALL 2,963,644
METHODS OF AND APPARATUS FOR DETERMINING THE WALL
THICKNESS OF METALLIC ELEMENTS
Filed Sept. 19, 1956 4 Sheets-Sheet 4

Edwin D. Nuttall
INVENTOR.

BY Vincent Martin
and
Jod E. Edwards
ATTORNEYS

United States Patent Office 2,963,644
Patented Dec. 6, 1960

2,963,644

METHODS OF AND APPARATUS FOR DETERMINING THE WALL THICKNESS OF METALLIC ELEMENTS

Edwin D. Nuttall, Shreveport, La., assignor to United Gas Corporation, Shreveport, La., a corporation of Delaware Filed Sept. 19, 1956, Ser. No. 610,731

6 Claims. (Cl. 324—37)

This invention relates to new and useful improvements in methods of and apparatus for determining the wall thickness of metallic elements.

The invention is particularly adaptable for use in determining the wall thickness of tubular conduits, such as pipe, tubing and the like, such determination thereby detecting and measuring corrosion in said wall.

Prior methods and apparatus for detecting corrosion in pipe, tubing or other conduits have depended upon apparatus which detects pits and irregularities in the wall of the borer, but because the exterior of certain of these conduits, such as buried pipe lines, are inaccessible, no indication or measurement of corrosion on the external surface is obtained by present types of apparatus.

It is one object of this invention to provide an improved method and apparatus which will accurately determine the wall thickness of metallic elements such as conduits, and which will provide for a measurement of variations in wall thickness, which variations are caused by internal or external corrosion, whereby an accurate analysis of the pipe is made and the presence of external corrosion, as well as internal corrosion, is indicated.

An important object is to provide an improved apparatus which is movable through the bore of a conduit, such as a pipe line or tubing, and which will effectively measure and indicate the presence of defects in the external surface of the pipe.

Another object is to provide an improved method and apparatus for setting up or establishing a magnetic flux density in the wall of the member under investigation so that said member acts as a variable reluctance in the return pathway for the flux; the variations in said reluctance being proportional to wall thickness, whereby measurement of said variations provide information as to the wall thickness and as to corrosion or defects on the exterior of said wall, which corrosion and defects would otherwise be undetectable.

A further object is to provide improved apparatus for establishing a magnetic flux in the wall of the conduit or member under investigation, together with means for intercepting the flux at a constant rate to thereby provide information as to the variations in flux density, which variations are caused by changes in the cross-sectional areas of said members; said changes in cross sectional area being caused by corrosion or defects, both external and internal, in said wall.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is a longitudinal sectional view of an apparatus, constructed in accordance with the invention for carrying out the improved method and illustrating said apparatus within the bore of a pipe or conduit.

Figure 2 is a transverse, sectional view taken on the line 2—2 of Figure 1.

Figure 3 is a transverse, sectional view, taken on the line 3—3 of Figure 1.

Figure 4 is an enlarged, sectional view of the intercepting coil and a portion or the rotor, such view being taken along the lines 4—4 of Figure 3.

Figure 5 is an isometric view of the rotor which carries the intercepting coil.

Figure 6 is a view similar to Figure 4, but illustrating a modified form of intercepting coil, and Figure 7 is a partial view of the record which is produced by the improved method and apparatus.

Figure 8 is a partially schematic longitudinal sectional view of a modified form of the apparatus, constructed in accordance with the invention and illustrating the use of said apparatus externally of a metallic wall.

Figure 9 is an enlarged isometric view of the sensing coil and the rail for carrying the sensing coil.

Figure 10:
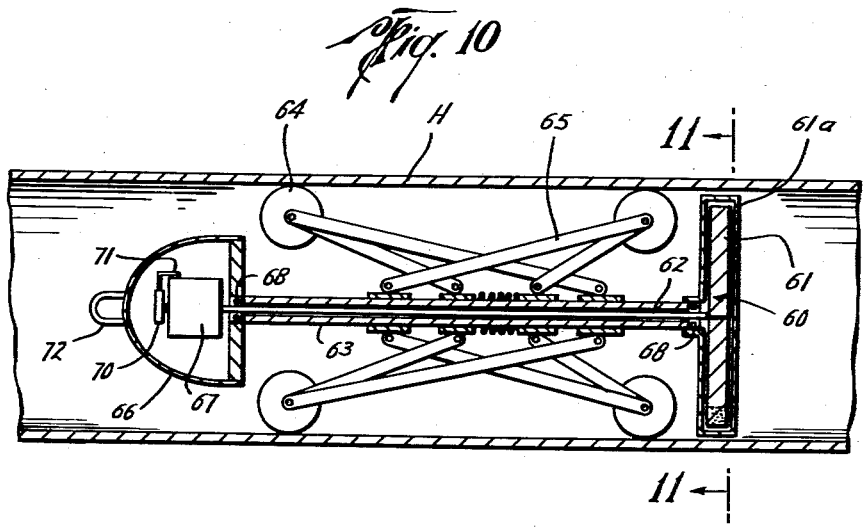
Figure 10 is a partially schematic longitudinal sectional view of a modified form of an apparatus constructed in accordance with the invention illustrating the apparatus within the bore of a conduit.

In the drawings, the numeral 10 designates a permanent magnet which is constructed with an elongate, central tubular portion 11 and specially shaped pole portions 12 and 13 at its ends. As illustrated, the portion 12 forms the north pole of the magnet, while the portion 13 forms the south pole thereof and said magnet may be constructed of any suitable material such as Alnico. Pole pieces are not necessarily cast with the magnet but may be fabricated out of soft iron and assembled to the Alnico central magnet. The magnet 10 actually forms the main body of the apparatus and to facilitate the movement of the magnet through the bore of a pipe or conduit A, a plurality of rollers or guide wheels 14 are secured on the outer ends of arms 15. Each arm is suitably pivoted to a collar 16, which is mounted on the tubular central portion 11 of the magnet. The number of rollers and their position circumferentially about the magnet is subject to variation, but as illustrated in Figure 2, three sets of rollers are provided and function to support the magnet within the bore A' of the conduit A. Not only do the rollers facilitate the movement of the apparatus through the conduit, but also said rollers properly space the magnet 10 axially within said conduit.

As will be explained, the apparatus is adapted to be moved through the conduit A, and since the magnet 10 is a permanent magnet, a magnetic field is established and a magnetic flux is directed through the wall of said conduit. The magnetic flux which is induced within the pipe wall is indicated by the dash-lines 17; obviously, the flow is from one pole of the permanent magnet 10, through the pipe wall and to the other pole of said magnet. Any change in the quantity of steel or iron in the flux return path will cause a variation in the density of the flux returning from the pipe wall to the pole of the magnet as determined by the sensing coil contained in the rotor or rate disc at any given instant and circumferential location. Therefore, as the magnet moves longitudinally through the conduit A, and assuming that the wall thickness of the conduit remains constant, the flux density will remain substantially constant. However, when the magnet 10 moves opposite an area where external corrosion such as that indicated at C in Figure 1 has occurred, the wall thickness at that point has been reduced and this results in a variation of the density of the flux returning from the pipe wall to the pole of the magnet. Of course, variations in the wall thickness of the conduit may be caused by irregularities or corrosion within the bore of the said conduit, but since various methods and apparatus are now available for measuring internal corrosion, the present invention finds greatest importance in locating and measuring external corrosion. It is noted that any variation in wall thickness of the conduit A, whether caused by internal or external corrosion, will result in a variation in the density of the flux returning from the pipe wall to the pole of the magnet.

For accurately measuring the variations in the density of the flux returning from the pipe wall to the pole of the magnet, which variations are indicative of corrosive effects on the pipe, a rotor or rate disk 18 is provided. The rotor or disk 18 is mounted adjacent to the pole 13 of the magnet and said disk as well as the pole 13 are enclosed within a non-magnetic protective shell or housing 19. The disk is mounted upon one end of a shaft 20, which extends through the bore 10a of the magnet 10, and the opposite end of said shaft has connection with a constant speed electric motor 21, whereby, the disk or rate wheel 18 is rotated at a constant speed.

The rotor or disk 18 is mounted in the manner illustrated in Figure 4, being secured to one end of the shaft 20 by suitable connecting threads 22. Suitable bearings 23 are provided. The rotor 18, as shown in Figure 5, is provided with an arm 25, which projects inwardly over the periphery of the pole portion 13 of the magnet 10 and this arm is formed with a recess 26 which receives an electrical coil 27. One end of the coil 27 is grounded to the rotor, while a lead wire 28 extends from the coil and then through the shaft 20, which is tubular, to the opposite end of said shaft at the point where the motor 21 is attached. As will be explained, the coil is connected in a suitable electrical circuit. The rotor 18 has a counterbalancing arm 29 which is disposed diametrically opposite to the coil-carrying arm 25, so as to balance the rotor during rotation. Although not shown in the drawings a portion of the coil may be magnetically shielded to provide a greater and more precise information yield for certain types of corrosion.

An auxiliary housing or shell 29 is carried as an auxiliary unit attached to the magnet 10 which is opposite the rotor or rate disc 18, and this auxiliary unit contains suitable equipment 30 in the form of a D.C. amplifier, an electrical measuring circuit and a recorder. This auxiliary unit also contains a suitable source of power, such as a battery (not shown). Power also may be supplied through a cable with the auxiliary unit located at the end of the conduit. Electrical connections between the amplifier, electrical measuring circuit and the recorder 30 and the conductor 28 which extends from the coil 27 is made through lead wire 28a and the usual rotating contact connection 31 forming a conventional slip ring information take off assembly. Power is supplied to the motor through a conductor 32, which extends from the power source forming part of the equipment 30. Additional supporting wheels 33 are provided for additionally supporting the auxiliary unit 29, and a suitable cable 34 for pulling the apparatus through the conduit has connection with the equipment.

In the operation of the apparatus and the practice of the improved method, the apparatus is moved through the conduit A in the direction of the arrow in Fig. 1, with the apparatus being suitably centered and supported within the conduit by the supporting rollers 14 and 33. Since the magnet 10 is of the permanent type, a magnetic flux, as indicated at 17, is induced within the wall of said conduit. The magnet is of course of an appropriate size, designed to induce the necessary flux density in the conduit wall, and the wall acts as a variable reluctance in the return pathway for this flux.

As the apparatus is moving through the conduit, the motor 21 is rotating the rotor or rate disk 18 at a constant speed and thus the coil 27, which is carried by the rotor, is caused to intercept or cut the flux at a constant rate around the pole 13 of the magnet. It is desirable to locate the coil precisely in the flux stream between the pole 13 and the wall of the conduit. The coil 27 is connected electrically with the amplifier electrical measuring and recorder circuit and the voltage output of said coil is utilized to actuate the recorder in the well known manner of circuits of this type. Since the coil is rotated at a constant speed in the return flux path, the voltage output of said coil will be in accordance with the density distribution of the flux in this flux path. The quantity of steel or iron, that is, the cross-sectional area of the wall of the conduit A, forms a reluctance in the return pathway for the flux and any change in this cross-sectional area will cause variations in the density of the flux returning from the pipe or conduit wall to the pole 13 at any given instant and circumferential location. Because the coil 27 is intercepting or cutting the flux at a constant rate, the variations in the density of the flux result in changes of the voltage output of the electrical coil 27, which changes are recorded by the equipment 30. By properly calibrating the recorder, it is evident that the variations in the voltage output of the coil may be made representative of cross-sectional changes in the wall of the conduit. It is therefore evident that as the apparatus moves through the conduit, the recorder will record the thickness of the wall. When the apparatus moves opposite an external, corrosive area, such as indicated at C, the variations in the density of the flux will result in variations in the voltage output of coil 27 and the recording of such variations in voltage output which are proportional to changes in wall thickness will indicate the presence of such external corrosive area.

To minimize the effects of vibrations on measurement accuracy, it is desirable to properly shape the coil 27 so that said coil has a minimum turn exposure to the flux lines for vibration moments. The general shape of the coil would be a maximum length for sensing the variations in flux density and a minimum width to reduce the effects of vibration. The vibration voltage vector would be either additive or substractive to the information yield vector according to the length-width ratio of the coil design and its instantaneous position, assuming a constant rate cutting a constant flux. Of course, if desired, two or more coils appropriately connected and arranged to cut the flux at a constant rate could be employed.

The apparatus may be moved through the conduit A by any suitable means, a pulling cable 34 being illustrated, and the detecting accuracy of the apparatus is independent of the forward speed or travel of the device; thus it would make no difference at what speed said apparatus was moved through the conduit. It is apparent that continuous scanning of the entire pipe or tubing wall is provided because the measuring or detecting coil 27 is rotated at a constant speed so that at any given instant it is measuring the flux density in the return path along a particular area of the conduit wall.

As has been noted, the coil which detects and measures the flux density is subject to variation, and in Figure 6 a modified coil winding is illustrated. In this case, the coil 27a is provided and electrical conductors 28b and 28c extend from the coil and then through the tubular shaft 20 to the recording equipment. It has been found that the particular shape of the coil arrangement should be in accordance with the particular conduit or pipe under measurement. Also, by changing the size, shape or number of the coils, maximum information yield for different types of pipe and tubing and for different conditions of corroded areas may be obtained. In other words, a coil might be designed to locate exceptionally deep corroded areas, whereas in other instances, small pits or lightly corroded areas might be more important to the operator. The invention contemplates the provision of any type of sensing coil or coils arranged in accordance with the particular conditions.

In Figure 7 an illustration of the type of recording obtained by the recorder 30 is shown. The recorder may include a stylus (not shown) which forms a base line 35, and so long as the thickness of the wall of the conduit remains the same, the stylus will follow said line. However, upon moving opposite a corroded area, such as that indicated at C, the variation in flux density changes the voltage output of the coil to cause the stylus to move off the base line, as indicated at 36. Also, the stylus forms offsets 37 and 38 in the recording line.

The distance between line 36 and base line 35 is representative of the depth of the corroded area C, this distance being indicated at D in Figure 7. The distance E between the offsets 37 and 38 in the base line represents the extent or length of the corroded area. Of course, the invention is not to be limited to any specific type of recorder because any of the well known recorders which are electrically operated by sensing coils may be employed.

From the foregoing it will be seen that a very simple apparatus and an improved method for continuously scanning metallic elements is provided. The invention has been shown as movable through the bore of a tubular conductor, such as a pipe line and, as illustrated, measurement of corroded areas on the external surface of said line is possible; prior methods and apparatus have not been able to accurately detect and measure corrosion in the inaccessible, external surface of these conduits. Although the invention has been shown and described as primarily adapted for use in measuring and detecting external corrosion in conduits, it is evident that the unit could be employed for accurately determining the wall thickness of any round or tubular metallic element.

Referring now to Figure 8 of the drawings, a modification of the apparatus described above is shown being used to detect corrosion in the internal surface of a tubular vessel F. A pair of spaced stationary tracks designated at 40 and 41 respectively extend transversely along the surface to be measured. A pair of permanent magnets 42 and 43 are positioned adjacent the tracks 40 and 41 respectively. A monorail 44 constructed of a material of low reluctance joins the permanent magnets 42 and 43 in a path conforming to the surface to be investigated.

Figures 8 and 9 show the sensing coil 45 carried by a suitable chassis 46 rotatably mounted on suitable wheels 47 to transverse the monorail 44. The coil is wound on a permanent magnet 48 and contacts the monorail 44 through the brush contact 49. It will be noted that a low reluctance path for the flux intercepted by the coil 45 through the chassis 46 and the wheels 47 is provided to the rail 44 in addition to the brush contact 49.

Means for reciprocating the chassis or carriage 46 along the rail 44 between the magnets 42 and 43 are provided in the form of solenoids 50 and 51 suitably secured to the magnets 42 and 43 respectively. Operating switches 52 and 53 actuate the solenoids 50 and 51 respectively through suitable external circuits (not shown) when engaged by the carriage 46 so as to be closed. These solenoids 50 and 51 actuate plungers 50a and 51a which serve to impart reciprocatory motion to the carriage 46. A period of dwell is provided when the carriage reaches its ultimate position adjacent either of the magnets 40 or 43 by time delay switches 54 and 55. During these periods of dwell stepping solenoids 56 and 57 operate the rack and pinion 58 or the rack and pinion 59 respectively to advance the entire assembly along the rails 40 and 41 the width of a scan preparatory to another movement of the carriage 46 along the rail 44. Suitable means such as described above are provided for measuring the effect of flux variations as caused by changes in the cross-sectional area of the wall as at G. Switches may be provided to de-energize the travel feature of the entire assembly to permit continuous or repeated scanning of a particular area if such is desired.

Figure 11:
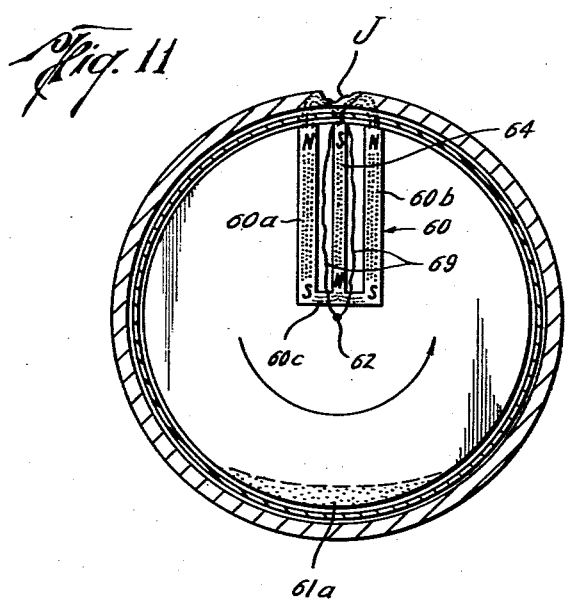
Figure 11 is an enlarged transverse sectional view takenh on the line 11—11 in Figure 10.

Another modified form of the invention is shown in Figures 10 and 11 in the form of a permanent magnet assembly broadly designated at 60 for use particularly with conduits of such large size as would make the permanent magnet 10 shown in Figure 1 of excessive size. The assembly 60 is carried by a rate wheel 61 which is fixed to a tubular shaft 62 which is rotatably mounted within an elongated housing 63. It will be noted that the magnet assembly 60 includes a pair of magnets 60a and 60b having like poles adjacent the tubular member or conduit H. The magnets 60a and 60b are joined at the bottom as at 60c and a sensing coil 64 is disposed between the magnets 60a and 60b. The rate wheel 61 is provided with a counterbalance 61a to off-set the weight of the magnet assembly 60 so that the rate wheel may rotate freely. The entire assembly is provided with a protective shell 61a.

The movement of the housing 63 through the bore of the conduit H is facilitated by a plurality of rollers or guide wheels 64 which are secured on the outer ends of arms 65 forming an assembly which also serves to center the assembly within the bore. A protective shell 66 is carried by the housing 63 to house the rate wheel drive motor 67. The shaft 62 is provided with suitable bearings 68 so as to be rotatably mounted within the housing 63. Suitable conductors 69 from the sensing coil pass through the tubular shaft 62 to a conventional slip ring assembly 70. A lead 71 is provided from the slip ring assembly 70 to an auxiliary unit (not shown) which may carry similar recording equipment to that described above. A suitable connection 72 is provided for a cable (not shown) to move the entire apparatus through the conduit bore.

It will be noted that the magnet assembly 60 induces magnetic flux into the conduit wall and that corroded portions such as is indicated at J will result in increased reluctance of the return flux path indicating a corroded portion in the conduit H.

The foregoing disclosure and description of the invention is illustrative and explanatory thereof, and various changes in the size, shape and materials, as well as in the details of the illustrated construction may be made, within the scope of the appended claims, without departing from the spirit of the invention.

What I claim is:

1. An apparatus for detecting external corrosion within a tubular conduit comprising a permanent magnet formed of an elongate central portion having generally circular poles at each end thereof, means for supporting said magnet and for moving the same through the bore of the conduit under investigation to locate the periphery of each pole piece adjacent to the wall of said conduit, whereby a magnetic flux is induced in the wall of said conduit, a rotor mounted adjacent one of the pole pieces and having an arm overlying the periphery of said pole, an electrical coil mounted on said arm and adapted to intercept the flux in the return path of flux from the conduit wall to the pole, and means for measuring the effect of flux variations as caused by changes in the cross-sectional area of the wall under investigation upon said coil.

2. An apparatus as set forth in claim 1, together with means for rotating said rotor at a constant speed, whereby the coil is rotated at a constant speed in the return flux path.

3. An apparatus as set forth in claim 1, wherein the means for measuring includes an electrical measuring circuit in which the coil is connected, and also wherein the voltage output of said coil as affected by variations in flux density is utilized to effect said circuit, and recording means for recording the changes in voltage output of said coil.

4. The method of determining wall thickness of a metallic element including, moving a permanent magnet along a path adjacent the wall under investigation to induce a magnetic flux in said wall while holding said magnet against rotational movement, periodically intercepting at a constant rate with respect to time the flux in the return flux path between the wall and a pole of the magnet with a rotating electrical coil sensitive to flux variation, and recording the effect of flux variations as caused by changes in the cross-sectional area of the wall under investigation upon said coil to thereby record the changes in the wall thickness.

5. The method of detecting corrosion in the external surface of a tubular conduit which includes, moving a permanent magnet through the bore of said conduit while holding said magnet against rotational movement with the poles of said magnet disposed closely adjacent to the wall of the conduit to thereby induce a magnetic flux in said wall, periodically intercepting the flux in the return flux path between the wall of the conduit and one of the poles of the magnet with a rotating electrical coil which is sensitive to flux variations, and recording the effect of flux variations as caused by changes in the cross-sectional area of the conduit wall under investigation upon said coil to thereby record the changes in the wall thickness, which changes may be caused by external corrosion.

6. The method as set forth in claim 5, wherein the interception of the flux with the electrical coil is at a constant rate with respect to time.

References Cited in the file of this patent

UNITED STATES PATENTS

| | | |
|---|---|---|
| 2,527,170 | Williams | Oct. 24, 1950 |
| 2,542,893 | Bender et al. | Feb. 20, 1951 |
| 2,553,350 | Bayhi | May 15, 1951 |
| 2,892,977 | Monaghan | June 30, 1959 |